United States Patent
Zimon et al.

(10) Patent No.: US 11,914,671 B2
(45) Date of Patent: Feb. 27, 2024

(54) PERFORMING UNCERTAINTY QUANTIFICATION ANALYSIS WITH EFFICIENT TWO DIMENSIONAL RANDOM FIELDS

(71) Applicant: International Business Machines Corporation, Armonk, NY (US)

(72) Inventors: Malgorzata Zimon, Warrington (GB); Robert Sawko, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 1011 days.

(21) Appl. No.: 16/148,486

(22) Filed: Oct. 1, 2018

(65) Prior Publication Data

US 2020/0104341 A1    Apr. 2, 2020

(51) Int. Cl.
*G06F 17/18*       (2006.01)

(52) U.S. Cl.
CPC .................... *G06F 17/18* (2013.01)

(58) Field of Classification Search
CPC ..................................................... G06F 17/18
See application file for complete search history.

(56) References Cited

U.S. PATENT DOCUMENTS

| | | | |
|---|---|---|---|
| 7,254,091 B1 | 8/2007 | Gunning et al. | |
| 8,972,231 B2 | 3/2015 | Sarma et al. | |
| 9,031,822 B2 | 5/2015 | Sarma et al. | |
| 9,223,042 B2 | 12/2015 | Maucec et al. | |
| 9,893,773 B2 | 2/2018 | Marzetta et al. | |
| 2005/0004833 A1 | 1/2005 | McRae et al. | |
| 2009/0043555 A1 | 2/2009 | Busby et al. | |
| 2013/0265382 A1 | 10/2013 | Guleryuz et al. | |

(Continued)

FOREIGN PATENT DOCUMENTS

EP    1996963 B1    11/2016

OTHER PUBLICATIONS

"Kozintsev, Computations with Gaussian Random Fields, 1999" (Year: 1999).*

(Continued)

*Primary Examiner* — Rehana Perveen
*Assistant Examiner* — Daniel E Miller
(74) *Attorney, Agent, or Firm* — Scully, Scott, Murphy & Presser, P.C.; Daniel P. Morris

(57) ABSTRACT

Method and system are provided for uncertainty quantification analysis with efficient two dimensional (2D) random fields. The method may be used in a modeling system. The method may include providing a covariance matrix of a set of parameters with a covariance function describing an occurring real world phenomenon; and generating a random field based on the covariance matrix including a controlled rank reduction to produce a reduced-rank random field dataset provided as a data structure with data compression. Generating the random field applies rank reduction of a block circulant with circulant blocks (BCCB) representation of a covariance matrix obtained from the covariance matrix using existing symmetry of eigenvalues to eliminate redundant computations. The method may include outputting a reduced-rank random field dataset for use in a user-provided model of the modeling system for uncertainty quantification analysis and simulation of the real world phenomenon.

18 Claims, 10 Drawing Sheets

(56) References Cited

U.S. PATENT DOCUMENTS

| | | | | |
|---|---|---|---|---|
| 2015/0193691 | A1* | 7/2015 | Silversides | G01V 5/06 706/11 |
| 2019/0141299 | A1* | 5/2019 | Siddiqui | G06T 3/4015 |

OTHER PUBLICATIONS

"Davis, Reduced-Rank Covariance Estimation in Vector Autoregressive Modeling, Dec. 5, 2014" (Year: 2014).*

"Pooch, A Survey of Indexing Techniques for Sparse Matrices, Jun. 1973" (Year: 1973).*

"Maurer, Conjugate Symmetry, Jun. 2011" (Year: 2011).*

"Nagar and Raman, Detecting Approximate Reflection Symmetry in a Point Set using Optimization on Manifold, Jun. 27, 2017" (Year: 2017).*

Chu, Moody T., and Robert J. Plemmons. "Low Rank Circulant Approximation." (2000). pp. 1-17, obtained from http://citeseerx.ist.psu.edu/viewdoc/download?doi=10.1.1.25.3155&rep=rep1&type=pdf on Dec. 14, 2021 (Year: 2000).*

Bardsley, Johnathan M. "MCMC-based image reconstruction with uncertainty quantification." SIAM Journal on Scientific Computing 34, No. 3 (2012): A1316-A1332, pp. 1-17 (Year: 2012).*

Authors Unknown, FFTW Home Page, as archived on Sep. 30, 2017, obtained from https://web.archive.org/web/20170930051843/https://www.fftw.org/ on Dec. 16, 2021, 3 pages, (2017) (Year: 2017).*

Blanchard, Pierre. "Fast hierarchical algorithms for the low-rank approximation of matrices, with applications to materials physics, geostatistics and data analysis." PhD diss., Université de Bordeaux, 2017, 202 pages (Year: 2017).*

Georgiou, S. D., and Stella Stylianou. "Block-circulant matrices for constructing optimal Latin hypercube designs." Journal of Statistical Planning and Inference 141, No. 5 (2011): pp. 1933-1943 (Year: 2011).*

Park, Min Ho, and M V Tretyakov. "A block circulant embedding method for simulation of stationary Gaussian random fields on block-regular grids." International Journal for Uncertainty Quantification 5, No. 6 (2015). Obtained from https://arxiv.org/pdf/1411.1552.pdf on Jul. 28, 2022 . 17 pages (Year: 2015).*

Brianzi, Paola, Fabio Di Benedetto, and Claudio Estatico. "Improvement of space-invariant image deblurring by preconditioned Landweber iterations." SIAM Journal on Scientific Computing 30, No. 3 (2008): 1430-1458. (Year: 2008).*

Davies, Tilman M., and David Bryant. "On circulant embedding for Gaussian random fields in R." Journal of Statistical Software 55 (2013): 1-21. (Year: 2013).*

Sidiropoulos, Nicholas D., Lieven De Lathauwer, Xiao Fu, Kejun Huang, Evangelos E. Papalexakis, and Christos Faloutsos. " Tensor decomposition for signal processing and machine learning." IEEE Transactions on Signal Processing 65, No. 13 (2017): 3551-3582. (Year: 2017).*

Chu, Moody T., and Robert J. Plemmons. "Real-valued, low rank, circulant approximation." SIAM Journal on Matrix Analysis and Applications 24, No. 3 (2003): 645-659. (Year: 2003).*

Taylor, Phillip. "Simulating Gaussian Random Fields and Solving Stochastic Differential Equations Using Bounded Wiener Increments." PhD diss., (University of Manchester, 2013.) <https://pure.manchester.ac.uk/ws/portalfiles/portal/54548975/FULL_TEXT.PDF> (Year: 2013).*

Wang, H., et al., "Combustion kinetic model uncertainty quantification, propagation and minimization", Progress in Energy and Combustion Science, Received Apr. 23, 2014, Accepted Oct. 13, 2014, pp. 1-31, vol. 47.

Efendiev, Y., et al., "Bayesian Uncertainty Quantification in Predictions of Flows in Highly Heterogeneous Media and Its Applications to the $CO_2$ Sequestration", U.S. Department of Energy Office of Scientific and Technical Information, Nov. 9, 2015, 12 pages.

Cao, Z., et al., "Bayesian model comparison and selection of spatial correlation functions for soil parameters", Structural Safety, Jul. 2014, 8 pages.

Do, D., et al., "Stochastic finite element analysis of structures in the presence of multiple imprecise random field parameters", To appear in: Comput. Methods Appl. Merch Engrg, Received May 21, 2015, Revised Nov. 2, 2015, Accepted date: Nov. 30, 2015, 52 pages.

Abrahamsen, P., et al., "A Review of Gaussian Random Fields and Correlation Functions", Norwegian Computing Center, Apr. 1997, 70 pages, Second Edition.

Xiu, D., et al., "The Wiener-Askey Polynomial Chaos for Stochastic Differential Equations", SIAM Journal on Scientific Computing, Recieved on Apr. 11, 2001, Accepted Apr. 12, 2002, Published Electronically Oct. 16, 2002, pp. 619-644, 2002, vol. 24, No. 2.

Mantoglou, A., et al., "The Turning Bands Method for Simulation of Random Fields Using Line Generation by a Spectral Method", Water Resources Research, Oct. 1982, pp. 1379-1394, vol. 18, No. 5.

Dietrich, C.R., et al., "Fast and Exact Simulation of Stationary Gaussian Processes Through Circulant Embedding of The Covariance Matrix", SIAM Journal on Scientific Computing, Jul. 1997, pp. 1088-1107, vol. 18, No. 4.

Davies, T.M., et al., "On Circulant Embedding for Gaussian Random Fields in R", Journal of Statistical Software, Nov. 2013, 21 pages, vol. 55, Issue 9.

Huang, S.P., et al., "Convergence study of the truncated Karhunen-Loeve expansion for simulation of stochastic processes", International Journal for Numerical Methods in Engineering, 2001, pp. 1029-1043, vol. 52, No. 9.

* cited by examiner

PERFORMING UNCERTAINTY QUANTIFICATION ANALYSIS WITH EFFICIENT TWO DIMENSIONAL RANDOM FIELDS

BACKGROUND

The present disclosure relates to performing uncertainty quantification analysis with efficient two dimensional (2D) random fields, and more specifically, to uncertainty quantification analysis with improved data compression.

Random fields, defined as families of random variables, are widely used as building blocks for modeling stochastic processes. Stochastic processes may be defined as being collections of random variables that have a probability distribution.

As examples, multi-dimensional heterogeneity can be used to represent the properties of biological tissues, velocity fields in turbulent flows, permeability coefficients of rocks, and its generation supports a design of complex materials across multiple length scales. There are many publications and patents that mention the use of two-dimensional random processes.

Modeling of inhomogeneous media allows incorporation of uncertainty in simulations accounting for: lack of knowledge about input parameters, variability in operating conditions, or inappropriate design assumptions. Such uncertainty quantification (UQ) study provides more accurate predictions about systems' behavior and enables replacement of physical experiments with non-destructive virtual testing.

Widely used Gaussian random fields (GRFs) with Gaussian probability distribution function serve as important building blocks for simulating natural and social processes. They are simple but reasonable models of stochastic properties, which can be specified by their expectations and covariance.

Therefore, efficient generation, processing and cost-effective storage of such random fields with prescribed correlations or covariances play a significant role in scientific analyses, numerical predictions and engineering design.

In the literature of the subject, widely used methods for generating Gaussian random fields are Cholesky factorization and eigendecomposition. The latter is more flexible as it is not limited to positive definite covariance matrices, but the cost of both approaches is similar. Given a sample of a random field on a uniformly spaced grid of M×N points, the covariance matrix has size M N×M N. Therefore, the computation of eigenvectors and eigenvalues takes a limiting behavior of $O(M^3N^3)$ time (in Big O notation) on a dense matrix; generating a realization of random field requires additional $O(M^2N^2)$ operations. It is possible to truncate the number of principal components to obtain a low-rank approximation with covariance matrix consisting of m<<MN eigenvalues. Such truncated Karhunen-Loeve expansion reduces the cost of storing large data sets as well as enables more efficient matrix-vector operations.

Less computationally intensive generation of Gaussian random field with isotropic (invariant under translations and rotations) and stationary (invariant under translations) correlation or covariance functions can be performed with turning bands method and circulant embedding, respectively. The latter approach is preferable when a non-negative definite embedding is available as it provides an exact sampling method, while the turning bands is an approximate technique. It has been demonstrated that it can be applied to generate realizations with many of the standard correlation functions used e.g. in geo-statistical simulations. Circulant embedding relies on two-dimensional (2D) fast Fourier transform significantly reducing the complexity over spectral and Cholesky decomposition. Each application of the method takes O(MN log MN) time to produce a random sample.

Although circulant embedding rapidly converges to the true statistics, it does not allow for standard truncated diagonalization as it results in a complex approximation of a covariance matrix.

SUMMARY

According to an aspect of the present invention there is provided a computer-implemented method for use in a modeling system with uncertainty quantification analysis with two dimensional random fields, the method comprising: providing a covariance matrix of a set of parameters with a covariance function describing an occurring real world phenomenon; generating a random field based on the covariance matrix including a controlled rank reduction to produce a reduced-rank random field dataset provided as a data structure with data compression, wherein generating the random field applies rank reduction of a block circulant with circulant blocks (BCCB) representation of a covariance matrix obtained from the covariance matrix using existing symmetry of eigenvalues to eliminate redundant computations; and outputting a reduced-rank random field dataset for use in a user-provided model of the modeling system for uncertainty quantification analysis and simulation of the real world phenomenon.

According to another aspect of the present invention there is provided a system for uncertainty quantification analysis with two dimensional random fields, comprising: a processor and a memory configured to provide computer program instructions to the processor to execute the function of components; a covariance matrix component for providing a covariance matrix of a set of parameters with a covariance function describing an occurring real world phenomenon, a random field generator for generating a random field based on the covariance matrix including a rank reduction component for applying controlled rank reduction to produce a reduced-rank random field dataset with data compression, wherein generating the random field applies rank reduction of a block circulant with circulant blocks (BCCB) representation of a covariance matrix obtained from the covariance matrix using existing symmetry of eigenvalues to eliminate redundant computations; and a random field output component for outputting a reduced-rank random field dataset for use in a user-provided model for uncertainty quantification analysis and simulation of the real world phenomenon.

According to a further aspect of the present invention there is provided a computer program product for uncertainty quantification analysis with two dimensional random fields, the computer program product comprising a computer readable storage medium having program instructions embodied therewith, the program instructions executable by a processor in a modeling system to cause the processor to: provide a covariance matrix of a set of parameters with a covariance function describing an occurring real world phenomenon, generate a random field based on the covariance matrix including a controlled rank reduction to produce a reduced-rank random field dataset provided as a data structure with data compression, wherein generating the random field applies rank reduction of a block circulant with circulant blocks (BCCB) representation of a covariance matrix obtained from the covariance matrix using existing symmetry of eigenvalues to eliminate redundant computations; output a reduced-rank random field dataset for use in a user-provided model of the modeling system for uncertainty quantification analysis and simulation of the real world phenomenon.

BRIEF DESCRIPTION OF THE DRAWINGS

Embodiments of the invention are particularly pointed out and distinctly claimed in the concluding portion of the specification. Embodiments of the invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The present disclosure describes a system for performing computational uncertainty quantification analysis involving 2D random fields, which provides a representation of a heterogeneous medium.

The described method and system generate random fields with a prescribed correlation structure and adjustable length-scale resolution. The described method and system take advantage of circulant embedding and 2D fast Fourier transforms to provide flexibility for controlling a rank of generated random fields maintaining the real-valued nature of the data. This leads to data compression that enables faster processing of the whole workflow.

Figure 1:
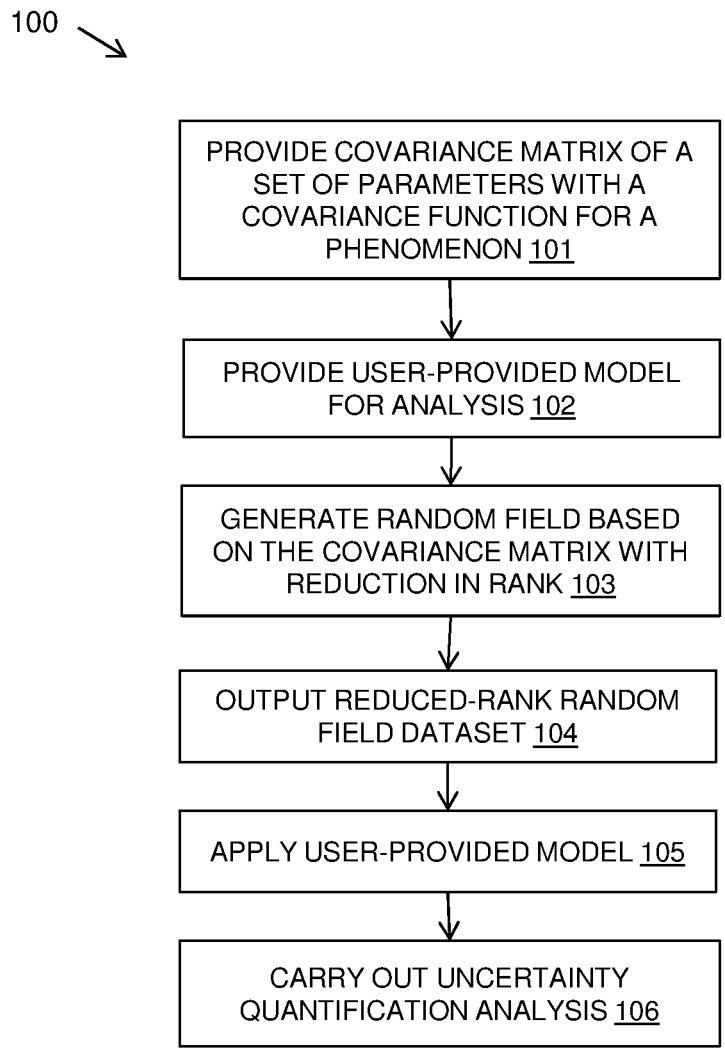
FIG. 1 is a flow diagram of an embodiment of a method in accordance with the present invention.

Referring to FIG. 1, a flow diagram 100 shows an example embodiment of the described method of performing computational uncertainty quantification analysis.

The method provides 101 a correlation or covariance matrix of a set of parameters with a correlation or covariance function describing commonly occurring phenomena. The terms "covariance matrix" and "covariance function" are used in the remainder of the description and may be interpreted to include a "correlation matrix" and "correlation function". The method may provide a library, which stores a variety of covariance functions representing phenomena covering a broad range of scientific applications, such as seismic Earth modeling, financial analysis, and fluid mechanics. The method enables efficient statistical analyses of such phenomena by means of fast and optimal realizations of stochastic media with data compression.

The method may provide 102 a user-provided model for uncertainty quantification analysis. This may be various forms of model and is treated as a "black box".

A random field is generated 103 based on a covariance function. The random field generation is described in more detail in FIGS. 3 and 4A below and includes a controlled rank reduction to produce a reduced-rank random field dataset with data compression. For 2D stochastic processes, random fields, the structure obtained is block circulant with circulant blocks (BCCB). The random field generation applies rank reduction of a BCCB matrix obtained from the covariance matrix using an existing symmetry of eigenvalues to eliminate redundant computations.

The generation of a random field may be based on user control of the rank reduction of the generated random field dataset to specify an amount of noise present in the input and its compression ratio.

The method may output 104 a reduced-rank random field dataset for use in the user-provided model for uncertainty quantification analysis. The method may input the reduced-rank random field dataset into the user-provided model to apply 105 the user-provided model and, in response to the model, may carry out 106 an uncertainty quantification (UQ) analysis. Inputting the reduced-rank random field dataset may include producing input files in a predefined format of data structure and offering an interface for communication with the user-provided model. The user-provided model may simulate data representing phenomena of a specific real world application for use in understanding and predicting behavior. The model enables prediction of a quantity of interest in a given problem. The simulation and UQ analysis may provide a detailed performance evaluation which complements experiments or even replaces physical tests that cannot be carried out.

Figure 2:
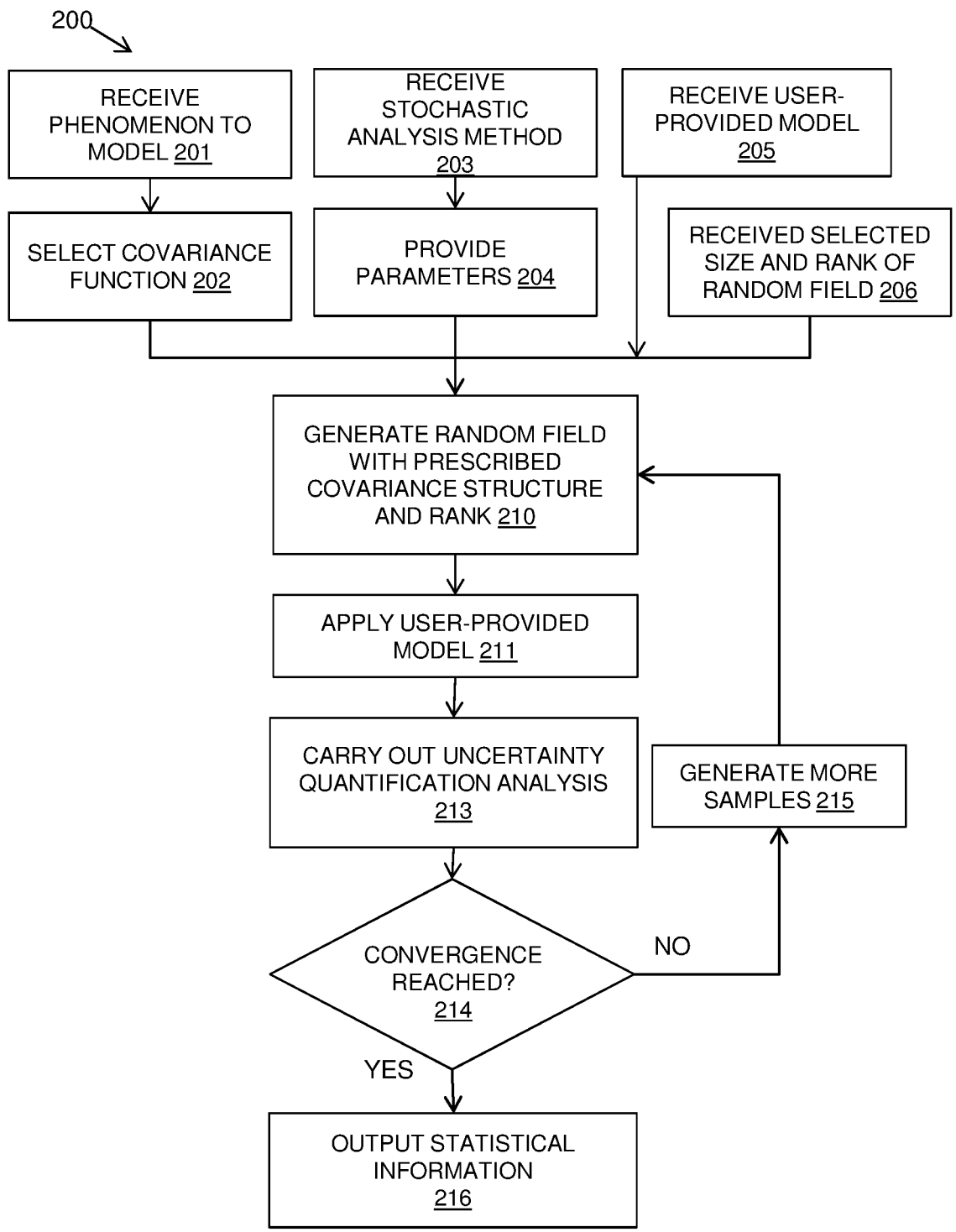
FIG. 2 is a flow diagram of an example embodiment of the method of FIG. 1.

Referring to FIG. 2, a flow diagram 200 shows a more detailed example embodiment of the described method.

The method may receive various inputs from a user including: receiving 201 the phenomenon to be modeled, receiving 203 the stochastic analysis method, receiving 205 the user-provided model, and receiving 206 a selected size and rank of random field to be used in the model. It will be appreciated that the user inputs may be configured to be set or varied as required.

In response to receiving 201 a phenomenon to model, the method may select 202 a covariance function to use from a library providing a variety of covariance functions representing phenomena covering a range of applications.

In response to receiving 203 the stochastic analysis method to be used, parameters to be modeled may be provided 204.

The method may generate 210 a random field with the prescribed covariance structure and rank as described in FIG. 1 and may apply 211 the user-provided model and carry out 213 uncertainty quantification analysis.

Carrying out 213 an uncertainty quantification analysis may include performing a number of realizations with uncertain parameters and analyzing the output. It may be determined 214 if the analysis reaches a convergence. If it has not, more samples may be generated 215 and the method may send the information back to generate 210 a new random field dataset.

In response to the analysis converging, the method may output 216 statistical information including providing a visualization of result of the analysis.

Figure 3:
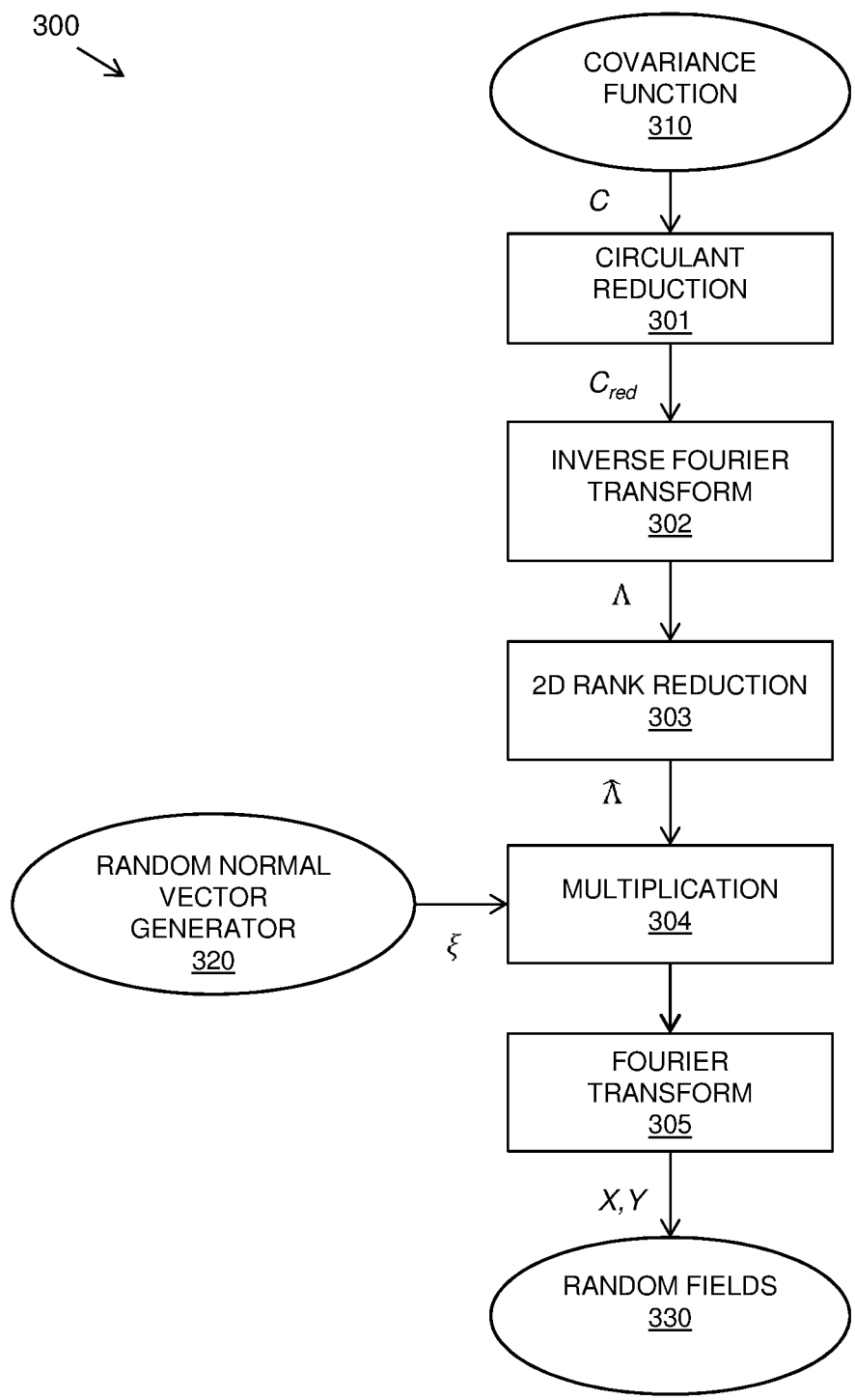
FIG. 3 is a flow diagram of an example embodiment of an aspect of the method in accordance with the present invention.

Referring to FIG. 3, a flow diagram 300 shows an example embodiment of a method of generating a random field as used in the method of FIG. 1 and FIG. 2. Fast generation of 2D random fields with circulant embedding is provided. Circulant embedding is a fast simulation method for random fields. Circulant matrices arise in applications in applied sciences in problems possessing a periodicity property.

A covariance function 310 may be input and a circulant reduction carried out 301 and an inverse Fourier transform may be applied 302. A 2D rank reduction 303 may be carried out on eigenvalue matrix A as described further in the method of FIG. 4A by rank reduction of a covariance block circulant matrix with circulant blocks. The result of the rank reduction, $\hat{\Lambda}$, may be multiplied 304 by a random vector, $\xi$, using a random normal vector generator 320 and a Fourier transform applied 305 to result in two samples of random fields X and Y 330.

The procedure extends a covariance matrix, which in 2D is a symmetric block Toeplitz with Toeplitz blocks (BTTB) matrix, to a nested real-valued block circulant with circulant blocks (BCCB) structure, C, whose spectral decomposition can be rapidly computed using Fast Fourier Transforms. It is convenient to represent the structure of a BCCB matrix with a reduced-size matrix, $C_{red}$, where each column represents shifted elements of each circulant block. The Fourier representation then can be defined as multiplication of 2D Fourier matrices and diagonal matrix with diagonal d=vec ($\Lambda$), where eigenvalue matrix, $\Lambda$, is calculated with Fourier matrix and $C_{red}$ and vec means a vectorization process of the matrix.

As mentioned before, such realizations can be obtained in various ways. A common approach, particularly in one dimension, is using spectral methods. In higher dimensions, the turning bands method is often preferred because of its computational efficiency. Another technique approximates a Gaussian field with a Matérn covariance by the solution to the stochastic partial differential equation when driven by Gaussian white noise. Its main limitation is restriction on values for the Matérn smoothness parameter. In addition, the boundary effects due to the boundary conditions need to be considered.

Figure 4A:
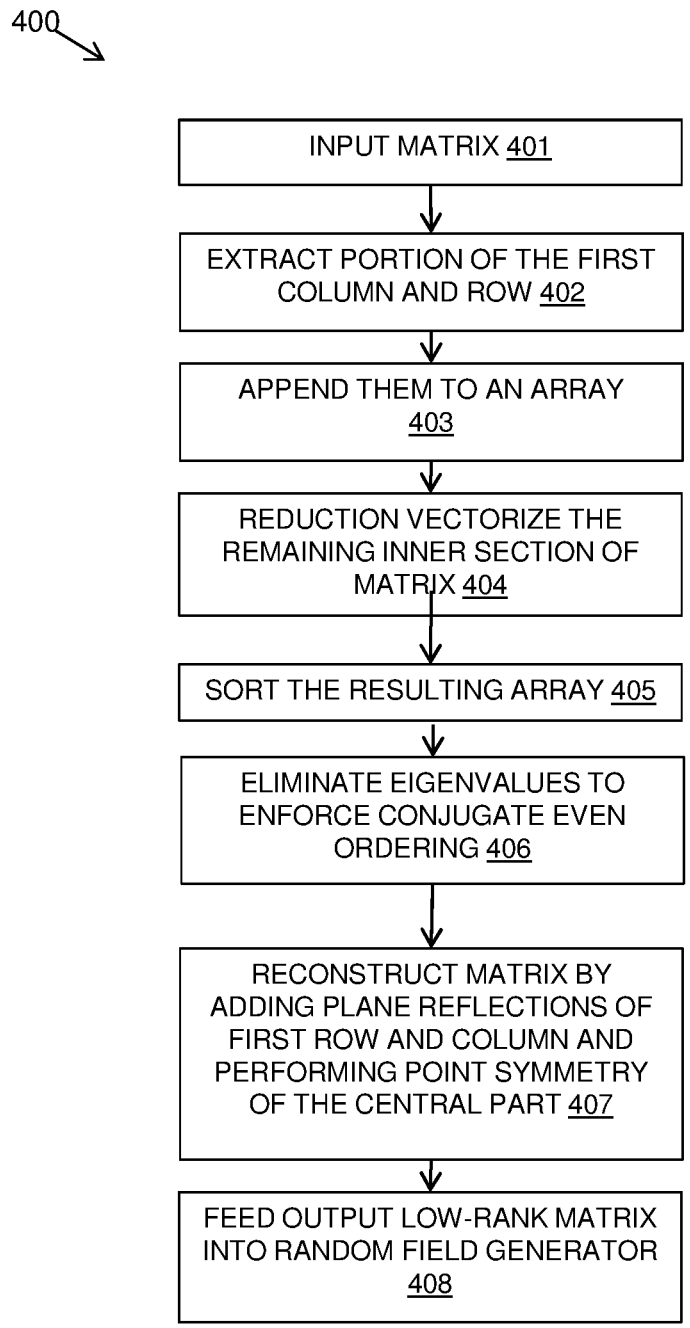
FIGS. 4A and 4B are a flow diagram and a schematic flow diagram of an example embodiment of a further aspect of the method in accordance with the present invention.
Figure 4B:
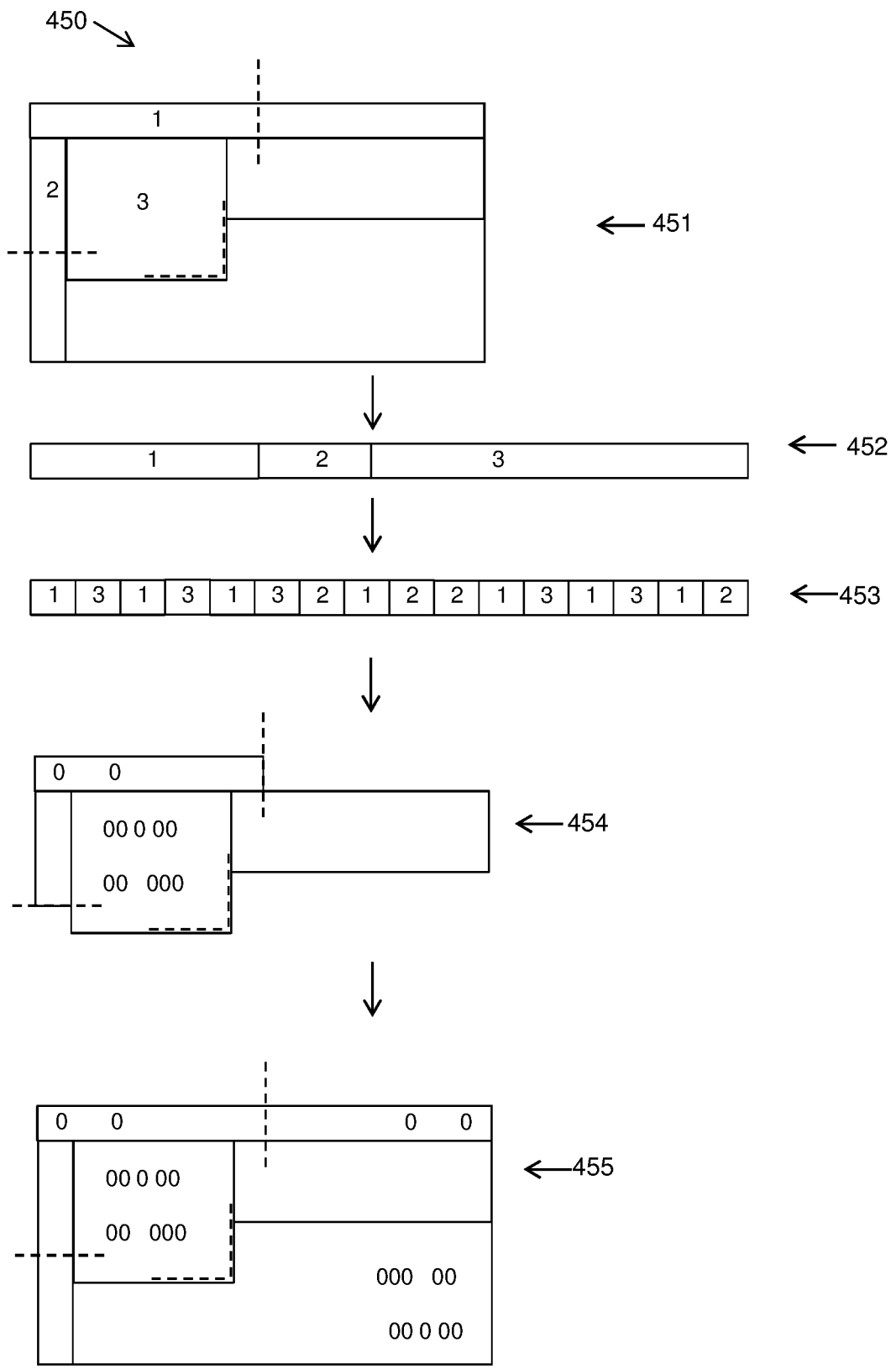

Referring to FIGS. 4A and 4B, a flow diagram 400 and schematic flow diagram 450 show an example embodiment of a method of rank reduction of a covariance block circulant matrix with circulant blocks (BCCB) as used in the described method. The method is specific to a BCCB structure and in order to keep the reduced data, real-valued symmetries have to be applied separately to the first column, first row and the remaining bottom right quadrant.

A matrix of circulant block structure may be input 401 and the matrix may be reduced by the following method.

A portion of a first row and a first column may be extracted 402 as shown by "1" and "2" in diagram 451 of FIG. 4B and appended 403 to an array 452. In one embodiment, this may append an extracted half of a first column and half of a first row of entries to the array.

The method may apply 404 reduction vectorizing to a remaining inner section of the matrix shown as "3" in diagram 451. In one embodiment, this may half vectorize a remaining inner section of the matrix. The objective of this phase is to linearize the data-set for subsequent sort operations.

The method may sort 405 the resultant array shown in diagram 453 and may eliminate 406 eigenvalues in a manner that enforces conjugate even ordering. Low-rank approximation of BCCB matrices requires preserving existing symmetries in eigenvalues referred to as conjugate even order. If this property is not maintained, the resulting covariance matrix would not be circulant and real-valued.

The method may reconstruct 407 the matrix by adding plane reflections of the first row and first column and performing point symmetry on the central part as shown in diagrams 454 and 455. The use of symmetry eliminates redundant computations. The output low-rank matrix may be fed 408 into a random field generator.

Having the ability to control a rank of Gaussian fields, the user can specify the amount of noise present in the input, its compression ratio, which directly translates to computational cost of further processing the data, and the size of parametric space, which enables more transparent comparison of different UQ methods.

Figure 5:
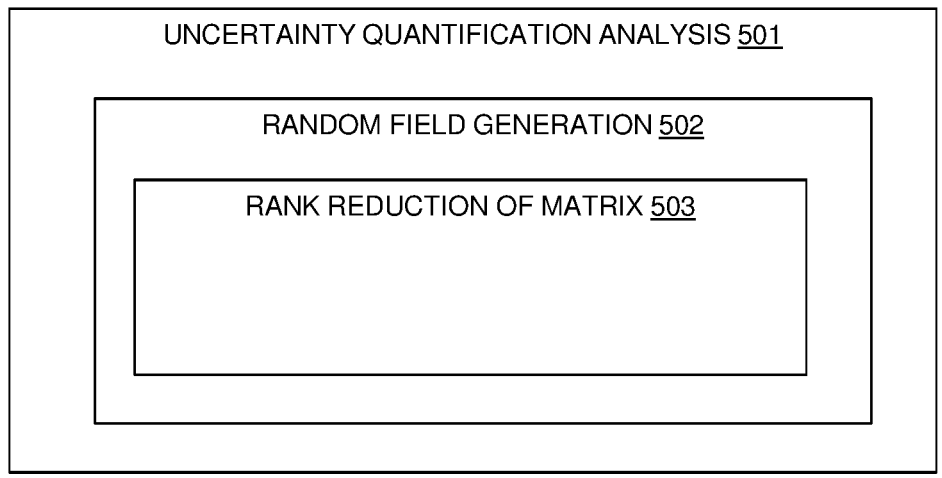
FIG. 5 is block diagram of an example embodiment of a system in accordance with the present invention.

FIG. 5 provides a block diagram of a modeling system 500 with an illustration of aspects of the described method. The modeling system 500 may be a computing system as described in relation to FIG. 6 below and may be a distributed computing system. The modeling system 500 may include a user interface for control inputs 501 for a real world phenomenon to be modeled and compression requirements that control the rank reduction of a covariance matrix 503 in a random field generator 502.

The random field generator 530 may output of reduced rank field datasets for use in uncertainty quantification analysis by an uncertainty quantification analysis component 661 applying a user-provided model 650. Constructing low-rank representation of the matrix allows the uncertainty quantification study to be performed on large-scale simulations and leads to realizable but reduced covariances.

Therefore, dataset instances may be processed with data compression and may be processed in parallel leading to processing efficiency and speed enabling a larger number of field instantiations to be processed in a shorter time. The modeling system 500 may also provide transparent comparisons of different uncertainty quantification methods.

Uncertainty quantification analysis is a high-throughput workflow taking advantage of distributed computing resources and benefitting from large sample sizes. Therefore, user-specified rank for the datasets allows control of the computational cost.

A user defines a scientific field within which his computational model operates. That allows the system to select the most applicable covariance function describing commonly occurring phenomena. Having the ability to control a rank of GRFs, the user can specify the amount of noise present in the input, its compression ratio, which directly translates to computational cost of further processing the data, and the size of parametric space, which enables more transparent comparison of different UQ methods.

After the random field is generated, a module of the system produces input files in a predefined format and offers an interface, which communicates with a computational model provided by the user, which is treated here as a "black box". A number of realizations with uncertain parameters are performed and the output files are analyzed. If the applied uncertainty quantification method, e.g. generalized polynomial chaos or Monte Carlo, has not converged, the information is sent back to the input generator to produce more random fields.

The described method proposes a circulant embedding technique with rank control, which is more efficient in evaluating Gaussian random fields with stationary covariance function. The method takes advantage of Fourier transforms. In addition, the control of rank is introduced, which is possible with more expensive methods such as eigendecomposition.

This combination of extensibility and fast computation has not been present in previous solutions and opens a way to process larger number of field instantiations at a shorter time. This may be carried out in a system by parallel processing reducing a memory footprint.

The process is completed when the stochastic moments of quantities of interest do not change with more samples being fed into the model. The system finalizes the study by producing graphical description of statistics or other output for interpreting and predicting a real world application or environment. The type and format of the output generated may be specified by the user.

The present solution introduces a system for uncertainty analyses, which incorporates methodology enabling the use of efficient random field generator with user-controlled data compression and noise regulation. The described embodiment is a computer-based implementation, which takes advantage of circulant embedding and 2D fast Fourier transforms.

It incorporates an improved method for random two-dimensional input generation and automates the process of tuning the properties of a stochastic field, providing advantages not found in currently known approaches and accelerating the workflow of uncertainty analysis.

The described method also focuses on a non-intrusive approach to performing statistical analyses.

As mentioned previously, the described solution for random field generation out performs truncated Karhunen-Loeve approach, which is currently used in applications such as image processing and statistics because of the reduced covariances that result in reduced processing and data storage being required and improved data computation speed.

The described method and system can be beneficial in number of applications where a user-provided model for uncertainty quantification analysis is used for a real world phenomenon including as examples:
mining: permeability matching in shale gas reservoirs;
acoustics: tracking of submarines;
computational seismology: modeling the Earth crust as a random field to study seismic scattering;
oceanography: study sound-speed fluctuations in the ocean;
power plants: estimation of temperature distribution in nuclear reactors due to changing operating conditions; and
mechanical: engine performance due to in-service degradation.

Figure 6:
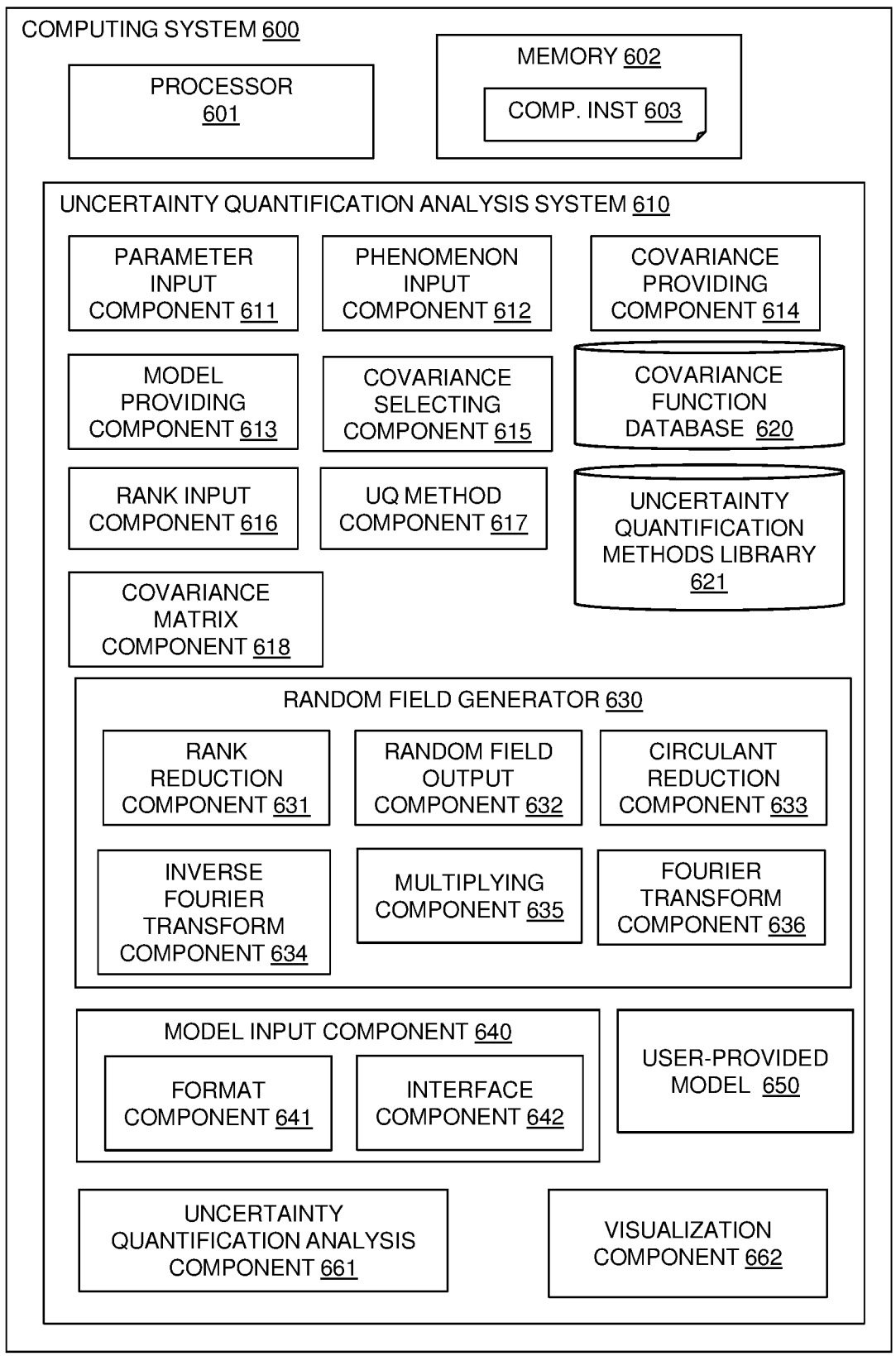
FIG. 6 is a block diagram of an example embodiment of a system in accordance with the present invention.

Referring to FIG. 6, a block diagram shows an example embodiment of the described system. A computing system 600 is shown including at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components. The computing system 600 may be a distributed computing system with components located on different networked computers.

An uncertainty quantification analysis system 610 is provided which may be executed on the computing system 600.

The uncertainty quantification analysis system 610 may include user input components including a phenomenon input component 612 for receiving user input of a phenomenon to be modeled. The uncertainty quantification analysis system 610 may include a covariance providing component 614 for providing a library or database 620 of covariance functions for commonly occurring phenomena and a covariance selecting component 615 for selecting a covariance function to provide the covariance matrix for a set of parameters.

The uncertainty quantification analysis system 610 may include a user input component in the form of an uncertainty quantification method component 617 that may be selected from an uncertainty quantification methods library 621 and a parameter input component 611 may receive parameters to be modeled.

The uncertainty quantification analysis system 610 may include a model providing component 613 for providing a user-provided model for uncertainty quantification analysis and a rank input component 616 for providing user control of the rank reduction of the generated random field dataset to specify an amount of noise present in the input and its compression ratio.

The uncertainty quantification analysis system 610 may include a covariance matrix component 618 for providing a covariance matrix of a set of parameters with a covariance function describing the commonly occurring phenomenon.

The uncertainty quantification analysis system 610 may include a random field generator 630 for generating a random field based on the covariance matrix including a rank reduction component 631 for applying controlled rank reduction to produce a reduced-rank random field dataset with data compression.

The random field generator 630 may include: a circulant reduction component 633 for applying circulant reduction; an inverse Fourier transform component 634 for applying an inverse Fourier transform; a multiplying component 635 for applying multiplication of a random normal vector; a Fourier transform component 636 for applying a Fourier transform; and an random field output component 632 for outputting a reduced-rank random field dataset for use in a user-provided model for uncertainty quantification analysis.

The uncertainty quantification analysis system 610 may include a model input component 640 for inputting the reduced-rank random field dataset into the user-provided model 650 and a uncertainty quantification analysis component 661 for, in response to the model, running an uncertainty quantification (UQ) analysis and a visualization component 662 for, in response to the analysis converging, providing a visualization of a result of the analysis.

The model input component 640 may include a format component 641 for producing input files in a predefined format and an interface component 642 for communication with the user-provided model 650.

The uncertainty quantification analysis component 661 performs a number of realizations with uncertain parameters and analyzes the output and, if the output has not converged, sends the information back to generate a new random field dataset.

Figure 7:
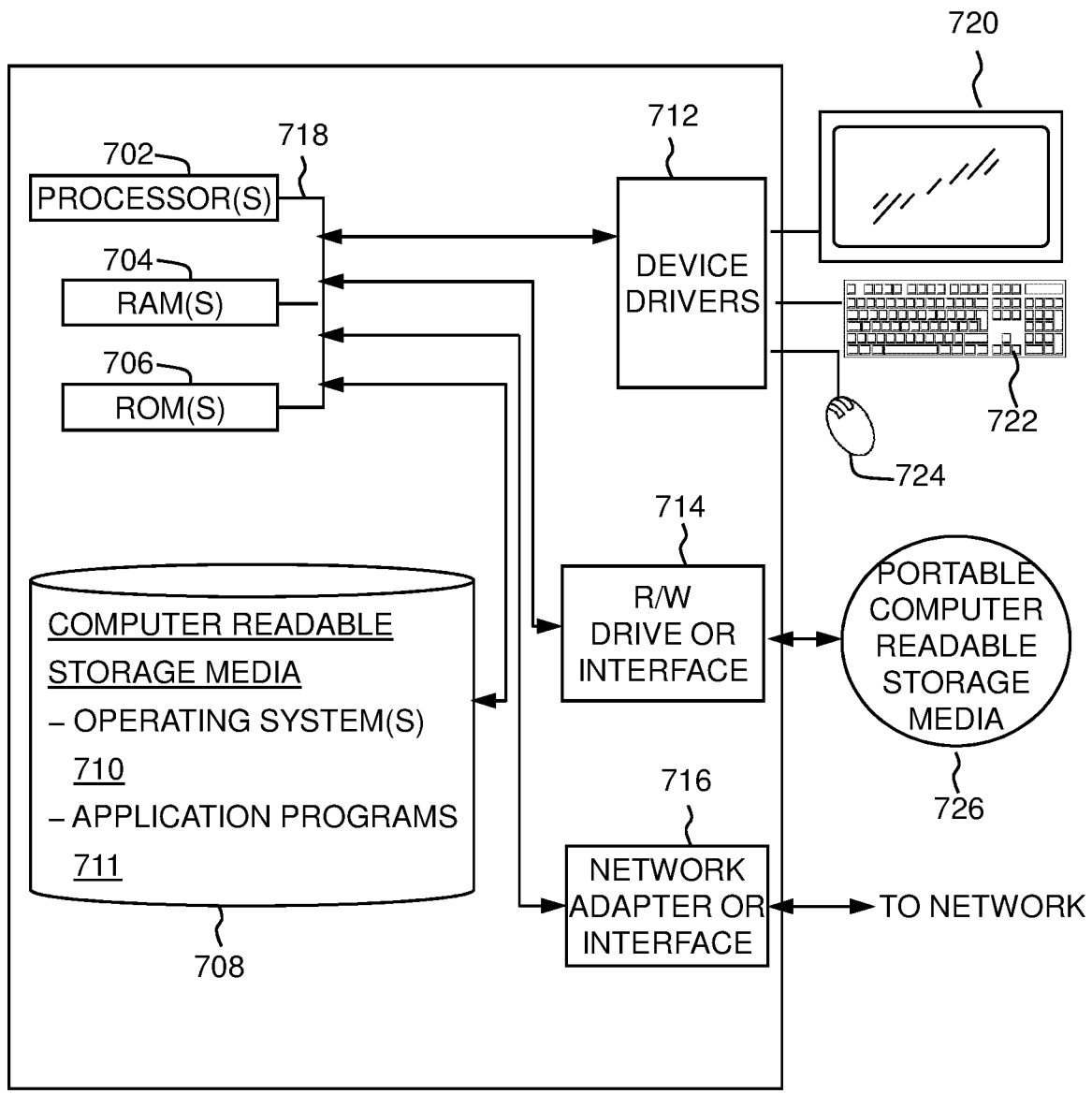
FIG. 7 is a block diagram of an embodiment of a computer system or cloud server in which the present invention may be implemented.

FIG. 7 depicts a block diagram of components of the computing system 600 of FIG. 6, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing system 600 can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as uncertainty quantification analysis systems 610, are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 600 can also include a R/W drive or interface 714 to read from and write to one or more portable computer readable storage media 726. Application programs 711 on computing system 600 can be stored on one or more of the portable computer readable storage media 726, read via the respective R/W drive or interface 714 and loaded into the respective computer readable storage media 708.

Computing system 600 can also include a network adapter or interface 716, such as a TCP/IP adapter card or wireless communication adapter. Application programs 711 on computing system 600 can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing system 600 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
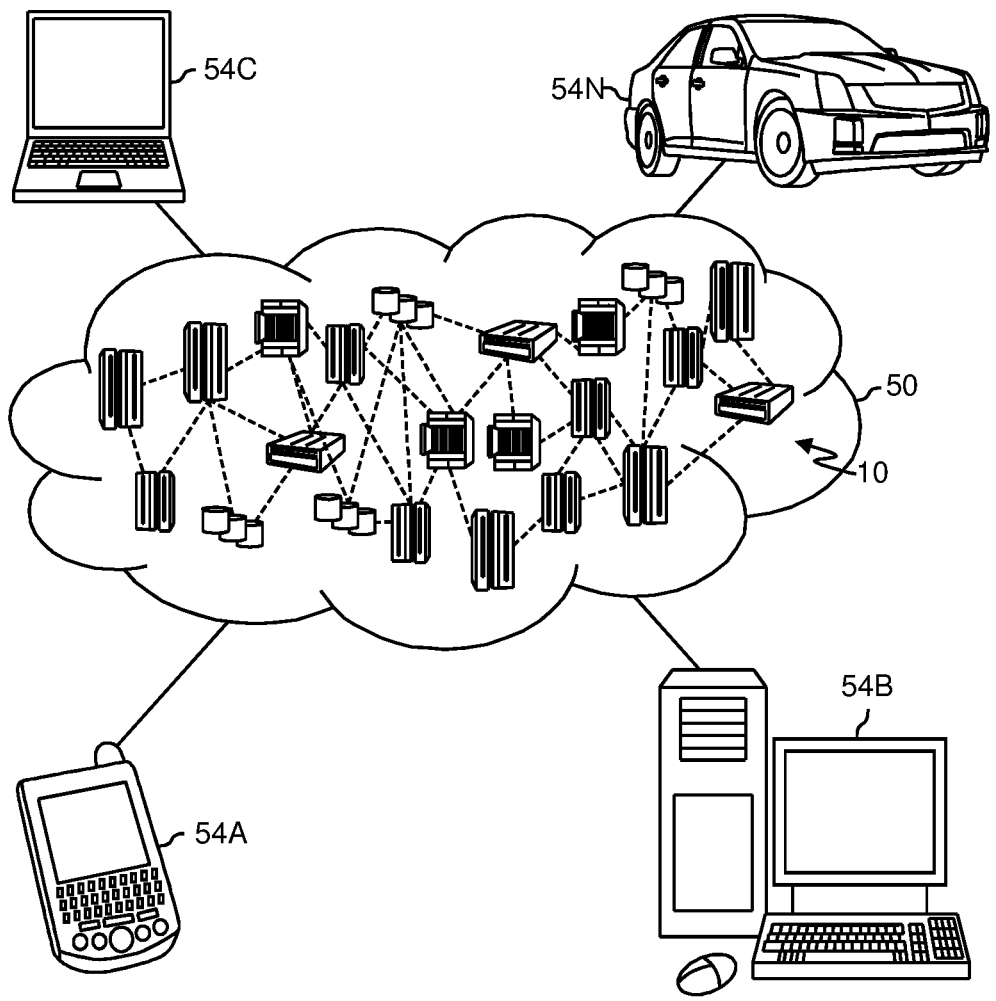
FIG. 8 is a schematic diagram of a cloud computing environment in which the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
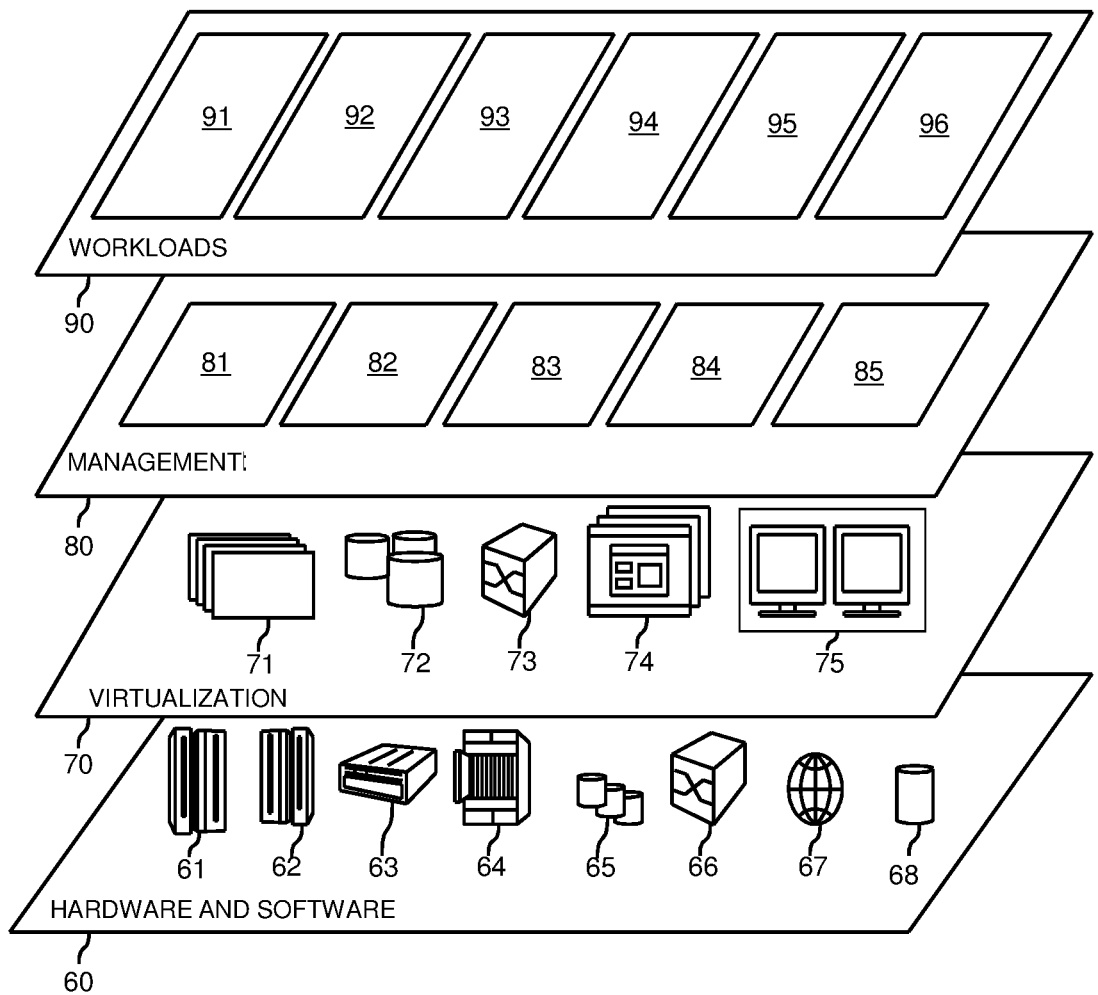
FIG. 9 is a diagram of abstraction model layers of a cloud computing environment in which the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and uncertainty quantification analysis processing 96 including random field generation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for use in a modeling system with uncertainty quantification analysis with two dimensional random fields, the method comprising:

providing a covariance matrix of a set of parameters with a covariance function describing an occurring real world phenomenon;

generating, by at least one hardware processor, a random field based on the covariance matrix including a controlled rank reduction to produce a reduced-rank random field dataset provided as a data structure with data compression, wherein generating the random field applies rank reduction of a block circulant with circulant blocks (BCCB) representation of the covariance matrix obtained from the covariance matrix using existing symmetry of eigenvalues to eliminate redundant computations; and outputting, by the at least one processor, the reduced-rank random field dataset for use in a user-provided model of the modeling system for uncertainty quantification analysis and simulation of the real world phenomenon, wherein applying rank reduction of the block circulant with circulant blocks (BCCB) representation of the covariance matrix includes:

reducing the BCCB representation of the covariance matrix entries by:
appending extracted reduced entries of a first column and row of the BCCB representation of the covariance matrix to an array, the extracted reduced entries including a portion of the first row of the BCCB representation of the covariance matrix and a portion of the first column of the BCCB representation of the covariance matrix;
reduction vectorizing a remaining inner section of the BCCB representation of the covariance matrix and including the reduction vectorized remaining inner section of the BCCB representation of the covariance matrix to the array, wherein the reduction vectorizing linearizes the remaining inner section of the BCCB representation of the covariance matrix, wherein the appending and reduction vectorizing linearizes a dataset of the BCCB representation of the covariance matrix in the array for a subsequent sort operation;
sorting the array; and
removing redundant conjugate pairs according to a user-specified threshold;
reconstructing the BCCB representation of the covariance matrix by adding plane reflections of the first row and column and performing point symmetry on a central part;
the method further including applying a random vector to the reduced and reconstructed BCCB representation of the covariance matrix in generating the reduced-rank random field dataset,
the method further including inputting the reduced-rank random field dataset into a user-provided model and, using the model, running an uncertainty quantification (UQ) analysis,
wherein the data compression reduces data storage usage and the method accelerates a computer processing speed in the uncertainty quantification analysis and simulation of the real world phenomenon.

2. The method as claimed in claim 1, including:
providing the user-provided model for uncertainty quantification analysis; and
in response to the analysis converging, providing a visualization of a result of the analysis.

3. The method as claimed in claim 1, including providing user control of the rank reduction of the generated random field dataset to specify an amount of noise present in an input and its compression ratio.

4. The method as claimed in claim 1, wherein reducing the BCCB representation of the covariance matrix entries includes:
appending extracted half of a first column and a first row entries to an array; and
half vectorizing a remaining inner section of the BCCB representation of the covariance matrix.

5. The method as claimed in claim 1, wherein the applying rank reduction of the block circulant with circulant blocks (BCCB) representation of the covariance matrix includes eliminating conjugate even pairs to enforce conjugate even ordering.

6. The method as claimed in claim 1, including providing a library of covariance functions for commonly occurring phenomena and selecting a covariance function to provide the covariance matrix for a set of parameters.

7. The method as claimed in claim 2, wherein inputting the reduced-rank random field dataset into the user-provided model includes:
producing input files in a predefined format and offering an interface for communication with the user-provided model.

8. The method as claimed in claim 2, wherein running the uncertainty quantification (UQ) analysis includes performing a number of realizations with uncertain parameters and analyzing an output of the uncertainty quantification analysis and, if the output has not converged, sending information back to generate a new random field dataset.

9. The method as claimed in claim 1, wherein generating the random field includes:
applying circulant reduction and an inverse Fourier transform to the covariance matrix in order to enable fast diagonalization of the block circulant with circulant blocks (BCCB) representation of the covariance matrix; applying multiplication of a random normal vector and applying a Fourier transform to a reduced rank matrix to obtain the reduced-rank random field dataset.

10. A system for uncertainty quantification analysis with two dimensional random fields, comprising:
a processor; and a memory configured to provide computer program instructions to the processor;
the processor configured to run parallel processing threads to:
provide a covariance matrix of a set of parameters with a covariance function describing an occurring real world phenomenon;
generate a random field based on the covariance matrix including applying controlled rank reduction to produce a reduced-rank random field dataset with data compression, wherein generating the random field applies rank reduction of a block circulant with circulant blocks (BCCB) representation of the covariance matrix obtained from the covariance matrix using existing symmetry of eigenvalues to eliminate redundant computations; and
output the reduced-rank random field dataset for use in a user-provided model for uncertainty quantification analysis and simulation of the real world phenomenon,
the processor is configured to reduce the BCCB representation of the covariance matrix entries by:
appending extracted reduced entries of a first column and row of the BCCB representation of the covariance matrix to an array, the extracted reduced entries including a portion of the first row of the matrix and a portion of the first column of the BCCB representation of the covariance matrix;
reduction vectorizing a remaining inner section of the BCCB representation of the covariance matrix and including the reduction vectorized remaining inner section of the BCCB representation of the covariance matrix in the array, wherein the reduction vectorizing linearizes the remaining inner section of the BCCB representation of the covariance matrix, wherein the appending and reduction vectorizing linearizes a dataset of the BCCB representation of the covariance matrix to the array for a subsequent sort operation;
sorting the array;
removing redundant conjugate pairs according to a user-specified threshold; and
reconstructing the BCCB representation of the covariance matrix by adding plane reflections of the first row and column and performing point symmetry on a central part;

the processor further configured to apply a random vector to the reduced and reconstructed BCCB representation of the covariance matrix in generating the reduced-rank random field dataset, and
input the reduced-rank random field dataset into a user-provided model and using the model, run an uncertainty quantification (UQ) analysis,
wherein the data compression reduces data storage usage and at least the rank reduction accelerates the speed of the processor performing the uncertainty quantification analysis and simulation of the real world phenomenon.

11. The system as claimed in claim 10, wherein the processor is further configured to:
provide the user-provided model for uncertainty quantification analysis; and
in response to the analysis converging, provide a visualization of a result of the analysis.

12. The system as claimed in claim 10, wherein the processor is further configured to provide user control of the rank reduction of the generated random field dataset to specify an amount of noise present in an input and its compression ratio.

13. The system as claimed in claim 10, wherein the processor is configured to eliminate conjugate even pairs to enforce conjugate even ordering.

14. The system as claimed in claim 10, the processor is configured to provide a library of covariance functions for commonly occurring phenomena and to select a covariance function to provide the covariance matrix for a set of parameters.

15. The system as claimed in claim 11, wherein the processor is configured to produce input files in a predefined format and an interface for communication with the user-provided model.

16. The system as claimed in claim 11, wherein the processor is configured to perform a number of realizations with uncertain parameters and analyzes an output of the uncertainty quantification analysis and, if the output has not converged, send information back to generate a new random field dataset.

17. The system as claimed in claim 10, wherein the processor is configured to:
apply circulant reduction;
apply an inverse Fourier transform;
apply multiplication of a random normal vector; and
apply a Fourier transform.

18. A computer program product for uncertainty quantification analysis with two dimensional random fields, the computer program product comprising a computer readable storage medium having program instructions embodied therewith, the program instructions executable by a processor in a modeling system to cause the processor to:
provide a covariance matrix of a set of parameters with a covariance function describing an occurring real world phenomenon;
generate a random field based on the covariance matrix including a controlled rank reduction to produce a reduced-rank random field dataset provided as a data structure with data compression, wherein generating the random field applies rank reduction of a block circulant with circulant blocks (BCCB) representation of the covariance matrix obtained from the covariance matrix using existing symmetry of eigenvalues to eliminate redundant computations;
output the reduced-rank random field dataset for use in a user-provided model of the modeling system for uncertainty quantification analysis and simulation of the real world phenomenon,
for applying the rank reduction to the BCCB representation of the covariance, the processor caused to reduce the BCCB representation of the covariance matrix entries by:
appending extracted reduced entries of a first column and row of the BCCB representation of the covariance matrix to an array, the extracted reduced entries including a portion of the first row of the BCCB representation of the covariance matrix and a portion of the first column of the matrix;
reduction vectorizing a remaining inner section of the BCCB representation of the covariance matrix and including the reduction vectorized remaining inner section of the BCCB representation of the covariance matrix to the array, wherein the reduction vectorizing linearizes the remaining inner section of the BCCB representation of the covariance matrix, wherein the appending and reduction vectorizing linearizes a dataset of the BCCB representation of the covariance matrix in the array for a subsequent sort operation;
sorting the array;
removing redundant conjugate pairs according to a user-specified threshold; and
reconstruct the BCCB representation of the covariance matrix by adding plane reflections of the first row and column and performing point symmetry on a central part,
the processor further caused to apply a random vector to the reduced and reconstructed matrix in generating the reduced-rank random field dataset, and
input the reduced-rank random field dataset into a user-provided model and using the model, run an uncertainty quantification (UQ) analysis,
wherein the data compression reduces data storage usage and at least the rank reduction accelerates the speed of the processor performing the uncertainty quantification analysis and simulation of the real world phenomenon.

* * * * *